US010489471B2

(12) United States Patent
Xiong et al.

(10) Patent No.: US 10,489,471 B2
(45) Date of Patent: Nov. 26, 2019

(54) RECOMMENDATION METHOD AND DEVICE

(71) Applicant: Alibaba Group Holding Limited, Grand Cayman (KY)

(72) Inventors: Junwu Xiong, Hangzhou (CN); Zhongyi Liu, Hangzhou (CN); Hu Wei, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 367 days.

(21) Appl. No.: 15/272,365

(22) Filed: Sep. 21, 2016

(65) Prior Publication Data

US 2017/0103133 A1    Apr. 13, 2017

(30) Foreign Application Priority Data

Oct. 9, 2015    (CN) .......................... 2015 1 0648588

(51) Int. Cl.
*G06F 16/00*    (2019.01)
*G06F 16/9535*    (2019.01)
(Continued)

(52) U.S. Cl.
CPC ............ *G06F 16/9535* (2019.01); *G06F 7/24* (2013.01); *G06F 16/9038* (2019.01)

(58) Field of Classification Search
CPC ..... G06F 16/9535; G06F 16/9038; G06F 7/24
See application file for complete search history.

(56) References Cited

U.S. PATENT DOCUMENTS 6,266,649 B1    7/2001 Linden et al.
7,711,735 B2    5/2010 Wu et al.
(Continued)

OTHER PUBLICATIONS

International Preliminary Report on Patentability to corresponding International Application No. PCT/US2016/052985 dated Apr. 19, 2018 (7 pages).

(Continued)

*Primary Examiner* — Robert W Beausoliel, Jr.
*Assistant Examiner* — Hau Hoang
(74) *Attorney, Agent, or Firm* — James J. DeCarlo; Greenberg Trarugi, LLP

(57) ABSTRACT

Disclosed is a recommendation method and device. The recommendation method and device includes: acquiring current user behavior data in a currently operating network system in real time to obtain real-time user behavior data of users on the network, the current user behavior data representing currently occurring user rating activities of the users on the network; updating existing rating data of the users, the existing rating data representing user ratings of network objects made by the users during prior interactions with the network system or other network systems, the updating comprising modifying the user ratings in accordance with the real-time acquired user behavior data to obtain current user rating data of the users currently interacting with the network system; determining based upon the current user rating data, one or more similarities chosen from a group of similarities consisting of similarities between the users on the network, similarities between the network objects rated by the users, and between similarities between the users and the network objects; and sending to users recommendations for new recommended network objects to users according to one or more of the determined similarities, the recommendations being sent to users while the users are currently interacting with the network system. The present disclosure can increase recommendation precision and improve recommendation effect.

15 Claims, 3 Drawing Sheets

(51) Int. Cl.
    *G06F 16/9038*     (2019.01)
    *G06F 7/24*     (2006.01)

(56) References Cited

U.S. PATENT DOCUMENTS

| | | |
|---|---|---|
| 7,921,071 B2 | 4/2011 | Hicks |
| 8,019,777 B2 | 9/2011 | Hauser |
| 8,060,463 B1 | 11/2011 | Spiegel |
| 8,095,523 B2 | 1/2012 | Brave et al. |
| 8,301,624 B2 | 10/2012 | Park et al. |
| 8,301,692 B1 | 10/2012 | Hamaker et al. |
| 8,407,178 B2 | 3/2013 | Hicks |
| 8,433,621 B2 | 4/2013 | Linden et al. |
| 8,442,973 B2 | 5/2013 | Cramer et al. |
| 8,756,224 B2 | 6/2014 | Dassa et al. |
| 8,832,753 B2 | 9/2014 | Andrade |
| 9,070,156 B2 | 6/2015 | Linden et al. |
| 9,100,722 B2 | 8/2015 | Andrade |
| 9,183,281 B2 | 11/2015 | Cheng et al. |
| 9,400,995 B2 | 7/2016 | Gu et al. |
| 2009/0164400 A1 | 6/2009 | Amer-Yahia et al. |
| 2009/0164897 A1 | 6/2009 | Amer-Yahia et al. |
| 2011/0087679 A1 | 4/2011 | Rosato et al. |
| 2011/0314007 A1 | 12/2011 | Dassa et al. |
| 2012/0036523 A1 | 2/2012 | Weintraub et al. |
| 2012/0311139 A1 | 12/2012 | Brave et al. |
| 2013/0054433 A1 | 2/2013 | Giard et al. |
| 2013/0151540 A1 | 6/2013 | Pathak et al. |
| 2013/0179252 A1 | 7/2013 | Dong et al. |
| 2013/0262966 A1 | 10/2013 | Wu et al. |
| 2013/0317910 A1 | 11/2013 | Mohamed |
| 2014/0143012 A1 | 5/2014 | Alon et al. |
| 2015/0106362 A1 | 4/2015 | Dassa et al. |
| 2015/0220555 A1* | 8/2015 | Wang .............. G06F 17/30867 707/624 |
| 2015/0379648 A1 | 12/2015 | Spiegel |

OTHER PUBLICATIONS

International Search Report and Written Opinion to corresponding International Application No. PCT/US2016/052985 dated Dec. 15, 2016.

Yanxiang Huang et al., "TencentRec: Real-time Stream Recommendation in Practice" (SIGMOD'15 May 31-Jun. 4, 2015).

* cited by examiner

RECOMMENDATION METHOD AND DEVICE

CROSS-REFERENCE TO RELATED APPLICATIONS

This application claims the benefit of priority of Chinese Application No. 201510648588.6, titled "Method and Apparatus for Making Recommendations," filed on Oct. 9, 2015, which is hereby incorporated by reference in its entirety.

TECHNICAL FIELD

The present disclosure relates to the field of Internet technologies, and in particular to a recommendation method and device.

BACKGROUND

With the development of Internet technology, users can obtain more and more content (e.g., network objects) from websites. As users browse websites to choose network objects, website recommendation systems typically play an important role. For example, users without clear demands are likely to directly choose network objects recommended by the recommendation systems of the websites. An efficient recommendation system not only can be used conveniently by users, increasing the value of a website, but also, more importantly, can reduce aimless behavior of the users, such as aimless browsing and clicking, which helps reduce the burden of website servers and saving network bandwidth resources.

At present, more and more websites are starting to have their own recommendation systems. Many websites adopt an off-line recommendation algorithm based on Hadoop Map/Reduce. Map/Reduce conducts data processing mainly by the method of batch processing, and normally reads data from disks. Therefore, the main idea of the off-line recommendation algorithm based on Hadoop Map/Reduce is conducting collaborative calculations based upon historical behavior data of the users from the day before or within a long prior period of time and outputting recommendations according to a calculation result. Such an algorithm often has low recommendation accuracy and poor positive impact, thus failing to meet the requirements of some application scenarios requiring real-time collaboration and fast response.

BRIEF SUMMARY

Multiple aspects of the present disclosure provide a real-time recommendation method and device, which are used for increasing recommendation accuracy and improving the effect such recommendations have on user behavior through making recommendations more timely and relevant, which increases user engagement and yields improvements in the fields of search, social networking and e-commerce, to name a few technologies, that are reliant upon recommendations as a key component of any service offering.

One aspect of the present disclosure provides a recommendation method, which includes:

acquiring current user behavior data in a currently operating network system in real time to obtain real-time user behavior data of users on the network, the current user behavior data representing currently occurring user rating activities of the users on the network; updating existing rating data of the users, the existing rating data representing user ratings of network objects made by the users during prior interactions with the network system or other network systems, the updating comprising modifying the user ratings in accordance with the real-time acquired user behavior data to obtain current user rating data of the users currently interacting with the network system; determining based upon the current user rating data, one or more similarities chosen from a group of similarities consisting of similarities between the users on the network, similarities between the network objects rated by the users, and between similarities between the users and the network objects; and sending recommendations for new recommended network objects to users according to one or more of the determined similarities, the recommendations being sent to users while the users are currently interacting with the network system.

In one alternative embodiment of the present disclosure, updating existing rating data of the users includes the execution of at least one of the following operations:

if the real-time user behavior data comprises real-time behavior data of new users on new network objects, generating, by the processor, rating data of the new users on the new network objects according to the real-time behavior data of the new users on the new network objects, and adding the rating data of the new users on the new network objects into the rating data of the users on the network objects in the network system or other network systems; if the real-time user behavior data comprises the real-time behavior data of new users on existing network objects, generating, by the processor, rating data of the new users on the existing network objects according to the real-time behavior data of the new users on the existing network objects, and adding the rating data of the new users on the existing network objects into the rating data of the users on the network objects in the network system or other network systems; if the real-time user behavior data comprises real-time behavior data of existing users on new network objects, generating, by the processor, rating data of the existing users on the new network objects according to the real-time behavior data of the existing users on the new network objects, and adding the rating data of the existing users on the new network objects into the rating data of the users on the network objects in the network system or other network systems; and if the real-time user behavior data comprises real-time behavior data of the existing users on existing network objects, generating, by the processor, rating data increments of the existing users on the existing network objects according to the real-time behavior data of the existing users on the existing network objects, and updating the rating data of the existing users on the existing network objects in the network system or other network systems based on the rating data increments.

In one alternative embodiment, determining one or more similarities chosen from a group of similarities includes: organizing, by the processor, the current user rating data based on one or more of dimensions of the users and one or more dimensions of the network objects to generate one or more of rating vectors of the users and one or more rating vectors of the network objects; and calculating, by the processor, one or more of similarities between the users, between the network objects, and between the users and the network objects based on one or more of the rating vectors of the users and the rating vectors of the network objects.

In one alternative embodiment, organizing the current user rating data of the users on the network objects includes: executing data structure reorganization on the current user rating data to generate a plurality of first key-value pairs, a key in each first key-value pair being an identifier of a user, and a value being an identifier of a network object and the rating data of the user identified by the identifier of the user on the network object identified by the identifier of the network object; correlating the first key-value pairs with a first key to generate rating vectors of users identified by the first key; reversing the first key-value pairs to generate a plurality of second key-value pairs, a second key-value pair key of each second key-value pair being an identifier of a network object, and a second-key-value pair value being an identifier of a user and the rating data of the user identified by the identifier of the user on the network object identified by the identifier of the network object; and the second key-value pairs with a second key to generate rating vectors of the network objects identified by the second key.

In one alternative embodiment, calculating one or more of similarities between the users, between the network objects, and between the users and the network objects according to the one or more of the rating vectors of the users and the rating vectors of the network objects includes at least one of the following operations: calculating, by the processor, similarity between every two of the network objects according to the rating vectors of the network objects; calculating, by the processor, similarity between every two of the users according to the rating vectors of the users; and calculating, by the processor, similarity between any one of the users and any one of the network objects according to the rating vectors of the users and the rating vectors of the network objects.

In one alternative embodiment, calculating similarity between every two of the network objects according to the rating vectors of the network objects includes: obtaining network objects having been rated by a same user to generate a network object subset; correlating the rating vectors of every two of the network objects in the network object subset, and correlating, by the processor, rating vectors of every two of uncorrelated network objects among the network objects according to the correlation between every two of the network objects in the network object subset to generate a correlation feature vector between every two of the network objects; and calculating similarity between every two of the network objects according to the correlation feature vector between every two of the network objects;

calculating a similarity between every two of the users according to the rating vectors of the users includes: obtaining users having rated a same network object to generate a user subset; correlating the rating vectors of every two of the users in the user subset, and correlating the rating vectors of every two of uncorrelated users among the users according to the correlation between every two of the users in the user subset to generate a correlation feature vector between every two of the users; and calculating similarity between every two of the users according to the correlation feature vector between every two of the users;

calculating a similarity between any one of the users and any one of the network objects according to the rating vectors of the users and the rating vectors of the network objects includes:

for any one of the users, correlating the rating vector of the user and the rating vector of any one of the network objects to generate a correlation feature vector between the user and any one of the network objects, and calculating a similarity between the user and any one of the network objects according to the correlation feature vector between the user and any one of the network objects.

In one alternative embodiment, sending recommendations to users for new recommended network objects according to one or more of the determined similarities includes at least one of the following recommendation operations: obtaining network objects with similarities to the network objects currently operated by the user requiring one or more network objects that meet a first preset condition as candidate objects from the network objects according to the similarities between the network objects and recommending network objects to the users requiring one or more network objects from the candidate objects;

obtaining users with similarities to the users requiring one or more network objects that meet a second preset condition as candidate users from the users according to the similarities between the users and recommending network objects to the users requiring one or more network objects from the network objects having been rated by the candidate users; and obtaining network objects with the similarities to the users requiring one or more network objects that meet a third preset condition as candidate objects from the network objects according to the similarities between the users and the network objects, and recommending network objects to the users requiring one or more network objects from the candidate objects.

In one alternative embodiment, the network objects are at least one of commodity objects and service objects; and the user behavior data comprises data about user behaviors selected from a group of behaviors consisting of: browsing, adding to favorites, adding to shopping cart, purchasing, paying, and reviewing.

Another aspect of the present disclosure provides a recommendation device, which comprises: acquisition logic executed by the processor for acquiring current user behavior in a currently operating network system in real time to obtain user behavior data of users on the network, the current user behavior data representing currently occurring user rating activities of the users on the network; update logic executed by the processor for updating existing rating data of the users, the existing rating data representing user ratings of network objects made by the users during prior interactions with the network system or other network systems, the updating comprising modifying the user ratings in accordance with the real time acquired user behavior data to obtain current user rating data of the users currently interacting with the network system; similarity processing logic executed by the processor for determining, based upon the current user rating data, one or more of similarities chosen from a group of similarities consisting of similarities between the users, between the network objects rated by the user, and between the users and the network objects; and recommendation logic executed by the processor for sending to users recommendations for new recommended network objects to users according to the one or more of the determined similarities, the recommendations being sent to users while the users are currently interacting with the network system.

In one alternative embodiment, the update logic further comprises logic for executing at least one of the following operations: if the user behavior data comprises behavior data of new users on new network objects, generating rating data of the new users on the new network objects according to the behavior data of the new users on the new network objects, and adding the rating data of the new users on newly added network objects into the rating data of the users on the network objects in the network system or other network systems;

if the user behavior data comprises the behavior data of new users on existing network objects, generating rating data of the new users on the existing network objects according to the behavior data of the new users on the existing network objects, and adding the rating data of the new users on the existing network objects into the rating data of the users on the network objects in the network system or other network systems;

if the real-time user behavior data comprises real-time behavior data of existing users on the new network objects, generating rating data of the existing users on the new network objects according to the real-time behavior data of the existing users on the new network objects, and adding the rating data of the existing users on the new network objects into the rating data of the users on the network objects in the network system or other network systems; and if the real-time user behavior data comprises real-time behavior data of the existing users on the existing network objects, generating rating data increments of the existing users on the existing network objects according to the real-time behavior data of the existing users on the existing network objects, and updating the rating data of the existing users on the existing network objects in the network system or other network systems based on the rating data increments.

In one alternative embodiment, the similarity processing logic further comprises logic for: organizing logic executed by the processor for organizing the current user rating data based on one or more of dimensions of the users and dimensions of the network objects to generate one or more of rating vectors of the users and rating vectors of the network objects; and calculating one or more of similarities between the users, between the network objects and between the users and the network objects based on one or more of the rating vectors of the users and the rating vectors of the network objects.

In one alternative embodiment, the similarity processing logic further comprises data structure reorganization logic executed by the processor for: executing data structure reorganization on the current user rating data to generate a plurality of first key-value pairs, a key in each first key-value pair being an identifier of a user, and a value being an identifier of a network object and the rating data of the user identified by the identifier of the user on the network object identified by the identifier of the network object; correlating the first key-value pairs with the same key to generate rating vectors of the users identified by the key; reversing the first key-value pairs to generate a plurality of second key-value pairs, a second key-value pair key of each second key-value pair being an identifier of a network object, and a second key-value pair value being an identifier of a user and the rating data of the user identified by the identifier of the user on the network object identified by the identifier of the network object; and correlating the second key-value pairs with a second key to generate rating vectors of the network objects identified by the key.

In one alternative embodiment, the similarity processing logic is specifically configured to execute, by the processor, at least one of the following operations: calculating similarity between every two of the network objects according to the rating vectors of the network objects; calculating similarity between every two of the users according to the rating vectors of the users; and calculating similarity between any one of the users and any one of the network objects according to the rating vectors of the users and the rating vectors of the network objects.

In one alternative embodiment, the similarity processing logic is further configured to: obtain network objects having been rated by a same user to generate a network object subset; correlate rating vectors of every two of the network objects in the network object subset, and correlate rating vectors of every two of uncorrelated network objects among the network objects according to the correlation between every two of the network objects in the network object subset to generate a correlation feature vector between every two of the network objects; and calculate a similarity between every two of the network objects according to the correlation feature vector between every two of the network objects;

where the similarity processing module is specifically configured to, in one embodiment: obtain users having rated a same network object to generate a user subset; correlate the rating vectors of every two of the users in the user subset, and correlate the rating vectors of every two of uncorrelated users among the users according to the correlation between every two of the users in the user subset to generate a correlation feature vector between every two of the users; and obtain similarity between every two of the users according to the correlation feature vector between every two of the users;

where the similarity processing module is specifically configured to: for any one of the users, correlate the rating vector of the user and the rating vector of any one of the network objects to generate a correlation feature vector between the user and any one of the network objects, and calculate a similarity between the user and any one of the network objects according to the correlation feature vector between the user and any one of the network objects.

In one alternative embodiment, the recommendation logic is specifically configured to execute at least one of the following operations: obtaining network objects with the similarities to the network objects currently operated by the users requiring one or more network objects that meet a first preset condition as candidate objects from the network objects according to the similarities between the network objects, and recommending network objects to the users requiring one or more network objects from the candidate objects; obtaining users with the similarities to the users requiring one or more network objects that meet a second preset condition as candidate users from the users according to the similarities between the users, and recommending network objects to the users requiring one or more network objects from the network objects having been rated by the candidate users; and obtaining network objects with the similarities to the users requiring one or more network objects that meet a third preset condition as candidate objects from the network objects according to the similarities between the users and the network objects, and recommending network objects to the users requiring one or more network objects from the candidate objects.

In one alternative embodiment of the present application, the network objects are at least one of commodity objects and service objects; the user behavior data comprises data about user behavior selected from the group of behaviors consisting of: browsing, adding to favorites, adding to shopping cart, purchasing, paying and reviewing.

In one embodiment, user behavior in a network system is acquired in real time to obtain real-time user behavior data; rating data of users on network objects in the previous network systems is updated according to the real-time user behavior data to obtain rating data of the users on the network objects in the current network system; similarities between the users, between the network objects and between the users and the network objects are calculated according to the rating data of the users on the network objects in the current network system; network objects are recommended to users requiring one or more network objects according to the similarities between the users, between the network objects and between the users and the network objects, thereby the purpose of recommendation is achieved. Moreover, because the present application combines real-time user behavior data with off-line data, by utilizing the real-time user behavior data to supplement the off-line data, the accuracy of recommendation can be increased, the effect of recommendation can be improved, thereby the requirement of application scenarios requiring real-time collaboration and fast response can be met.

BRIEF DESCRIPTION OF THE DRAWINGS

Described drawings herein are used for providing further understanding for the present disclosure and constitute a portion of the present application. Exemplary embodiments and descriptions thereof of the present disclosure intend to explain the present disclosure rather than improperly limiting the present disclosure. In the drawings.

DETAILED DESCRIPTION

Figure 1:
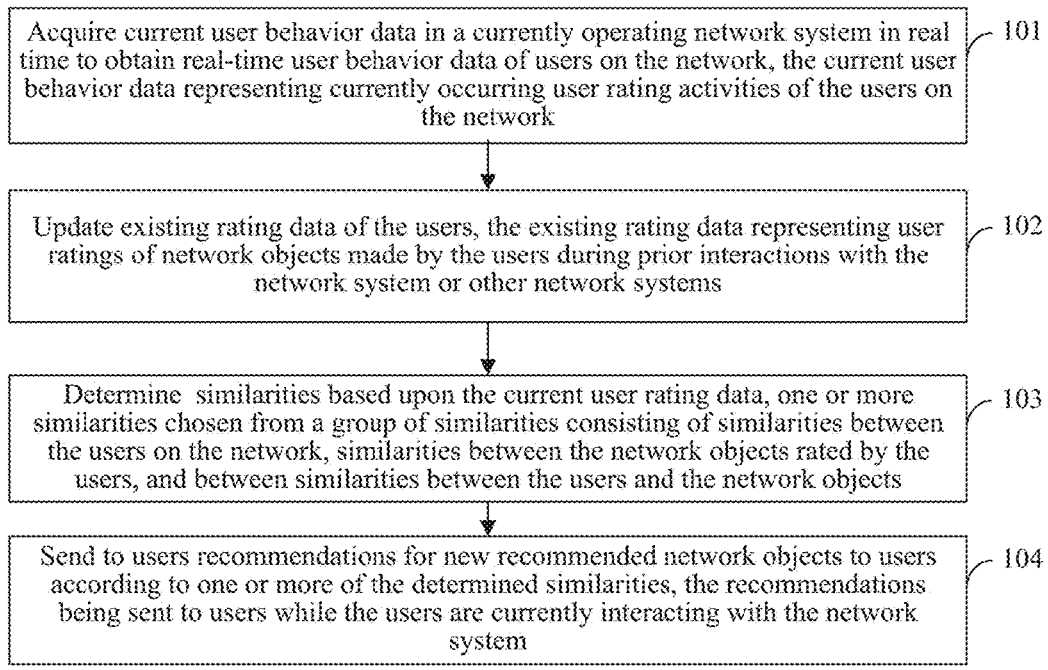
FIG. 1 is a flow diagram of a recommendation method provided by one embodiment of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

FIG. 1 is a flow diagram of a recommendation method provided by one embodiment of the present disclosure. As shown in FIG. 1, the method includes, in one embodiment:

Step 101: Acquire user behavior in a network system in real time to obtain real-time user behavior data.

Step 102: Update rating data of users on network objects in the previous network systems according to the real-time user behavior data to obtain rating data of the users on the network objects in the current network system.

Step 103: Calculate similarities between the users, between the network objects and between the users and the network objects according to the rating data of the users on the network objects in the current network system.

Step 104: Recommend network objects to users requiring one or more network objects according to the similarities between the users, between the network objects and between the users and the network objects.

The embodiment provides a recommendation method, the flow of which can be executed by a recommendation device. The method provided by the embodiment can be used by any application scenario based on the Internet to recommend information. For example, when a user shops on an E-commerce website, the E-commerce website can recommend commodities to the user by adopting the method provided by the steps of FIG. 1. For another example, when a user wants to download a video resource from a resource downloading website, the resource downloading website can recommend related video resources to the user. For another example, when a user orders takeout food via a takeout client application, the takeout client application can recommend related takeout commodities and the like to the user.

According to the different application scenarios, the network system and user behavior and network objects in the network system in the embodiment are different. The embodiment does not limit the forms of the network system and user behavior and network objects in the network system. For example, the network system can be a network system with every e-commerce website as a primary component. Accordingly, the network objects in the network system can be commodity objects, and the user behavior in the network system can include any one of browsing, adding to favorites, adding to shopping cart, purchasing, paying, and reviewing. In another example, the network system can be a network system with a resource downloading website as a primary component. Accordingly, the network objects in the network system can be downloadable resources, such as audio, video, or text resources, and the user behavior in the network system can include any one of previewing, downloading, playing, etc. In addition, the network objects of the embodiment can also be Internet-based service objects, and the service objects can be, e.g., a car washing service, maintenance service, massage service, cleaning service, door-to-door cooking service, housekeeping service, tutoring service, entertainment service, dining service, travel service, hotel service, car rental service, etc.

In one embodiment, the network system includes a collection of data, such as users, user behavior, network objects and rating data of users on network objects. Operational behavior of every user in the network system is referred to as user behavior in the network system. It should be noted that the recommendation device for executing the flow of the method shown in the steps of FIG. 1 can be put into practice as a functional module in every website or client, or can also be independent from every website or client, but can communicate with every website or client to cooperate with every website or client to carry out the recommendation.

In the embodiment, in order to more accurately and timely recommend network objects to users, the recommendation device acquires user behavior in the network system in real time to obtain real-time user behavior data, and combines the real-time user behavior data with historical data to recommend the network objects. In one implementation, the recommendation device can deploy a message streaming component at the front end, such as MetaQ (Metamorphosis), Notify or Kafka, to acquire user behavior in the network system in the form of real-time flow and output real-time user behavior data.

The recommendation device can acquire part of the user behavior in the network system in real time, and can also acquire all the user behavior in the network system in real time. User behavior of different users can be the same or different. For example, as a user A browses a certain network object in the network system, a user B may be executing the operation of adding the network object to the shopping cart, while a user C may be browsing the network object as well. User behavior of the same user at different times can be the same or different. For example, the user A was browsing a certain network object in the network system one minute ago, and one minute later, the user A is executing the operation of paying for the network object; or the user A was browsing a certain network object in the network system one minute ago, and two minutes later, the user A is still browsing the network object.

Real-time user behavior data acquired by the recommendation device includes log data, which is generated by various operations executed by the users on the network objects, such as browsing, adding to favorites, adding to shopping cart, purchasing, downloading, and playing.

Optionally, after real-time user behavior data is acquired, the recommendation device can perform one or more pre-processing procedures on the real-time user behavior data, such as cleaning of the data. In one embodiment, historical data used in combination with real-time user behavior data can mean rating data of users on network objects in the previous network system. In one embodiment, rating data of users on network objects can mean rating results obtained after the network objects are rated according to user behavior of the users on the network objects. For example, a weight function corresponding to each type of user behavior can be set in advance, then the weight functions corresponding to the various user behavior of a user on a network object can be summed, so that the rating data of the user on the network object is obtained.

For example, the rating data of the user k on the network object l can be represented by $r_{kl}=\Sigma_{x=1}^{t} f(x)$, wherein x represents the user behavior of the user k on the network object l, $f(x)$ represents the weight functions corresponding to the user behavior x, and t represents the sum of the user behavior of the user k on the network object l.

The user k can be referred to as a user rating the network object l, and the network object l can be referred to as a network object rated by the user k. The weight function corresponding to each user behavior can be given in advance according to experience, or can be obtained by machine learning. For a network object without user behavior, the rating data of the users on the network object can be initialized as 0, but is not necessarily limited to 0.

It should be noted that for a certain network object, when the network object does not have user behavior (that is, the network object is not rated by the users), the rating data of the users on the network object is initialized as 0. As user behavior is generated, the recommendation device can acquire the user behavior of the users on the network object, then obtain the weight functions corresponding to the user behavior, and add up the weight functions corresponding to the current user behavior, thereby obtaining new rating data of the users on the network object.

Because, in one embodiment, rating data of users on network objects embodies operation behavior of the users on the network objects, similarities between the network objects, between the users or between the users and the network objects can be mined or discovered by means of the rating data of the users on the network objects, and then network objects are recommended on the basis of these similarities.

Specifically, after the recommendation device obtains real-time user behavior data, the rating data of the users on the network objects in the previous network systems can be updated according to the real-time user behavior data, thus rating data of the users on the network objects in the current network system is obtained. Then, according to the rating data of the users on the network objects in the current network system, similarities between the users, between the network objects and/or between the users and the network objects are obtained; and according to the similarities between the users, between the network objects and/or between the users and the network objects, network objects are recommended to users requiring or more network objects.

In the network system, some cold start scenarios (e.g., a scenario when the network system has no previous data about the users or network objects), such as scenarios relating to new network objects, new users, etc., exist. In these embodiments, under different scenarios, real-time user behavior data is different, so modes of updating the rating data of the users on the network objects in the previous network system are also different according to the real-time user behavior data. Hence, according to whether user behavior relates to one or more of these scenarios, the user behavior can be divided into the following four types: behavior of existing users on existing network objects, behavior of new users on existing network objects, behavior of existing users on new network objects, and behavior of new users on new network objects. This means that user behavior acquired in real time may include one or more of the four types of behavior.

On the above basis, updating rating data of users on network objects in the previous network systems according to real-time user behavior data to obtain rating data of the users on the network objects in the current network system includes the execution of at least one of the following operations:

if the real-time user behavior data includes real-time behavior data of new users on new network objects, generating rating data of the new users on the new network objects according to the real-time behavior data of the new users on the new network objects, and adding the rating data of the new users on the newly added network objects into the rating data of the users on the network objects in the previous network systems;

if the real-time user behavior data includes the real-time behavior data of the new users on existing network objects, generating rating data of the new users on the existing network objects according to the real-time behavior data of the new users on the existing network objects, and adding the rating data of the new users on the existing network objects into the rating data of the users on the network objects in the previous network systems;

if the real-time user behavior data includes real-time behavior data of existing users on the new network objects, generating rating data of the existing users on the new network objects according to the behavior data of the existing users on the new network objects, and adding the rating data of the existing users on the new network objects into the rating data of the users on the network objects in the previous network systems; and if the real-time user behavior data includes real-time behavior data of the existing users on the existing network objects, generating rating data increments of the existing users on the existing network objects according to the real-time behavior data of the existing users on the existing network objects, and updating the rating data of the existing users on the existing network objects in the previous network system according to the rating data increments.

In one embodiment, the recommendation device can adopt any modes to maintain and manage rating data of users on network objects in the network system. For example, an implementation form can store rating data of users on network objects. However, considering that the number of users and data of network objects in the network system is large, the quantity of rating data of the users on the network objects is large, and in order to facilitate maintenance, management and usage, the recommendation device can also store the rating data of the users on the network objects in an organized manner according to one or more rules. For example, the rating data of the users on the network objects can be stored and managed from maintenance of the users or the network objects.

After the rating data of the users on the network objects in the current network system is obtained, in order to conveniently simplify the calculation flow to increase the efficiency of calculation, the recommendation device can organize the rating data of the users on the network objects in the current network system from the dimensions of the users and/or the network objects to generate rating vectors of the users and/or rating vectors of the network objects, and this specifically means generating a rating vector of each user in the current network system and/or a rating vector of each network object in the current network system. It should be noted that for the rating vectors of the users or the network objects which do not need to be updated, rating vectors of the corresponding users or network objects in the previous network systems can be directly used as rating vectors of the corresponding users or network objects in the current network system. Then, the recommendation device obtains similarities between the users, between the network objects and/or between the users and the network objects according to the rating vectors of the users and/or the rating vectors of the network objects. Specifically, according to the rating vectors of the users, the similarities between the users are calculated; according to the rating vectors of the network objects, the similarities between the network objects are calculated; according to the rating vectors of the users and the rating vectors of the network objects, the similarities between the users and the network objects are calculated.

It should be noted that the above-mentioned process of generating the rating vectors of the users and the rating vectors of the network objects can be implemented in the process of obtaining the rating data of the users on the network objects in the current network system or after the rating data of the users on the network objects in the current network system is obtained.

Optionally, if the similarities between the network objects are adopted in the subsequent network object recommendation process, then only the rating vectors of the network objects are generated in the above-mentioned process of generating the rating vectors, consequently, calculation is simplified, and efficiency is increased. If the similarities between the users are adopted in the subsequent network object recommendation process, then the rating vectors of the users are generated in the above-mentioned process of generating the rating vectors, consequently, calculation is simplified, and efficiency is increased.

Preferably, in the above-mentioned process of generating the rating vectors, the rating vectors of the users and the rating vectors of the network objects are generated together. Consequently, various similarities (such as similarities between the users, between the network objects and/or between the users and the network objects) can be calculated flexibly and conveniently, compatibility is high, and application scenarios are more flexible.

Then, the above-mentioned process of organizing the rating data of the users on the network objects in the current network system from the dimensions of the users and the network objects to generate rating vectors of the users and rating vectors of the network objects includes:

carrying out data structure reorganization on the rating data of the users on the network objects in the current network system to generate a plurality of first key-value pairs, the key in each first key-value pair being an identifier of a user, and the value being an identifier of a network object and the rating data of the user identified by the identifier of the user on the network object identified by the identifier of the network object; the rating data of each user on each network object forming a first key-value pair;

correlating the first key-value pairs with the same key to generate rating vectors of the users identified by the key;

reversing the first key-value pairs to generate a plurality of second key-value pairs, the key of each second key-value pair being an identifier of a network object, and the value being an identifier of a user and the rating data of the user identified by the identifier of the user on the network object identified by the identifier of the network object; the rating data of each user on each network object forming a second key-value pair; and correlating the second key-value pairs with the same key to generate rating vectors of the network objects identified by the key.

Optionally, obtaining similarities between the users, between the network objects and/or between the users and the network objects according to the rating vectors of the users and/or the rating vectors of the network objects includes at least one of the following operations:

calculating similarity between every two (or more) of the network objects according to the rating vectors of the network objects; calculating similarity between every two (or more) of the users according to the rating vectors of the users; and calculating similarity between any one of the users and any one of the network objects according to the rating vectors of the users and the rating vectors of the network objects.

Specifically, an embodiment of calculating similarity between every two (or more) of the network objects according to rating vectors of the network objects includes: obtaining network objects having been rated by the same user to generate a network object subset; correlating the rating vectors of every two (or more) of the network objects in the network object subset, correlating the rating vectors of every two (or more) of the uncorrelated network objects among the network objects according to the correlation between every two (or more) of the network objects in the network object subset to generate a correlation feature vector between every two (or more) of the network objects, and calculating similarity between every two (or more) of the network objects according to the correlation feature vector between every two (or more) of the network objects.

For example, if a first user has rated a network object A, a network object B and a network object C and a second user has rated the network object B, the network object C and a network object D, then the network object A, the network object B and the network object C form a network object subset, and accordingly, the network object B, the network object C and the network object D form a network object subset. For each network object subset, the rating vectors of every two (or more) of the network objects in the network object subset are correlated to generate a correlation feature vector between every two (or more) of the network objects.

For example, for the network object subset containing the network object A, the network object B and the network object C, the rating vectors of the network object A and the network object B can be correlated to generate a correlation feature vector between the network object A and the network object B, the rating vectors of the network object A and the network object C can be correlated to generate a correlation feature vector between the network object A and the network object C, and the rating vectors of the network object B and the network object C can be correlated to generate a correlation feature vector between the network object B and the network object C. For example, for the network object subset containing the network object B, the network object C and the network object D, the rating vectors of the network object B and the network object C can be correlated to generate a correlation feature vector between the network object B and the network object C, the rating vectors of the network object B and the network object D can be correlated to generate a correlation feature vector between the network object B and the network object D, and the rating vectors of the network object C and the network object D can be correlated to generate a correlation feature vector between the network object C and the network object D.

In addition, according to the correlation between every two (or more) of the network objects in the two (or more) network object subsets, uncorrelated network objects among the network objects, such as the network object A and the network object D, are determined, and then the rating vectors of the uncorrelated network objects among the network objects are correlated according to the correlation between every two (or more) of the network objects in the two (or more) network object subsets. Thus, the rating vectors of the network object A and the network object D are correlated to generate a correlation feature vector between the network object A and the network object D. Thus, after the correlation feature vector between every two (or more) of the network objects is obtained, similarity between every two (or more) of the network objects is obtained according to the correlation feature vector between every two (or more) of the network objects.

Specifically, an embodiment of calculating similarity between every two (or more) of the users according to rating vectors of the users includes: obtaining users having rated the same network object to generate a user subset; correlating the rating vectors of every two of the users in the user subset, correlating the rating vectors of every two (or more) of the uncorrelated users among the users according to the correlation between every two (or more) of the users in the user subset to generate a correlation feature vector between every two (or more) of the users, and calculating similarity between every two (or more) of the users according to the correlation feature vector between every two (or more) of the users.

For example, if a first user, a second user and a third user have respectively rated a network object A and the first user, the third user, and a fourth user have respectively rated a network object B, then the first user, the second user and the third user can form a user subset, and the first user, the third user and the fourth user can form a user subset. For each user subset, the rating vectors of every two (or more) of the users in the user subset are correlated to generate a correlation feature vector between every two (or more) of the users in the user subset.

Specifically, in one embodiment, for the user subset containing the first user, the second user and the third user, the rating vectors of the first user and the second user are correlated to generate a correlation feature vector between the first user and the second user, the rating vectors of the first user and the third user are correlated to generate a correlation feature vector between the first user and the third user, and the rating vectors of the second user and the third user are correlated to generate a correlation feature vector between the second user and the third user. For the user subset containing the first user, the third user and the fourth user, the rating vectors of the first user and the third user are correlated to generate a correlation feature vector between the first user and the third user, the rating vectors of the first user and the fourth user are correlated to generate a correlation feature vector between the first user and the fourth user, and the rating vectors of the third user and the fourth user are correlated to generate a correlation feature vector between the third user and the fourth user.

In addition and in one embodiment, according to the correlation between every two (or more) of the users in the two (or more) user subsets, uncorrelated users among the users, such as the second user and the fourth user, are determined, and then the rating vectors of the uncorrelated users among the users are correlated according to the correlation between every two (or more) of the users in the two (or more) user subsets. Thus, in one embodiment, the rating vectors of the second user and the fourth user are correlated to generate a correlation feature vector between the second user and the fourth user. Thus, after the correlation feature vector between every two (or more) of the users is obtained, similarity between every two (or more) of the users is obtained according to the correlation feature vector between every two of the users.

Specifically, in one embodiment, calculating similarity between any one of the users and any one of the network objects according to rating vectors of the users and the rating vectors of the network objects includes: for any one of the users, the rating vector of the user and the rating vector of any one of the network objects are correlated to generate a correlation feature vector between the user and any one of the network objects, and calculating similarity between the user and any one of the network objects according to the correlation feature vector between the user and any one of the network objects. For example, if the network system comprises a network object A, a network object B and a network object C altogether, then the rating vector of a first user can be respectively correlated with the rating vectors of the network object A, the network object B and the network object C to generate correlation feature vectors between the first user and the network object A, the network object B and the network object C. Specifically, in one embodiment, the rating vector of the first user and the rating vector of the network object A are correlated to generate a correlation feature vector between the first user and the network object A, the rating vector of the first user and the rating vector of the network object B are correlated to generate a correlation feature vector between the first user and the network object B, and the rating vector of the first user and the rating vector of the network object C are correlated to generate a correlation feature vector between the first user and the network object C.

In one embodiment, in the process of generating a correlation feature vector between any one of the users and any one of the network objects, the correlation feature vector between any one of the users and any one of the network objects can be generated according to the correlation feature vector between every two (or more) of the users and/or the correlation feature vector between every two (or more) of the network objects. In one embodiment, when any one of the users and any one of the network objects need to be correlated, the correlation between any one of the users and any one of the network objects can be established according to the correlation between every two (or more) of the users, and/or the correlation between any one of the users and any one of the network objects can be established according to the correlation between every two (or more) of the network objects.

In addition, in one embodiment, any one of the network objects is a network object rated by the users, not including new network objects. In one embodiment, any one of the users is a user who has rated the network objects (for example, having issued reviews), not including new users.

If the rating vectors of the two (or more) network objects, the rating vectors of the two users or the rating vectors of a certain user and a certain network object rated by the user are not changed, then the similarity between the two (or more) does not need to be recalculated, but it is not limited to this. In another embodiment, the similarity can be recalculated.

In one embodiment, the recommendation device can adopt a JStorm Job stream framework, a Flink flow framework or a Spark flow framework to implement the method flow after acquisition of real-time user behavior data. Taking adoption of the JStorm Job stream framework as an example, one embodiment of an implementation of the method of the present disclosure in a practical application is described below.

Figure 2:
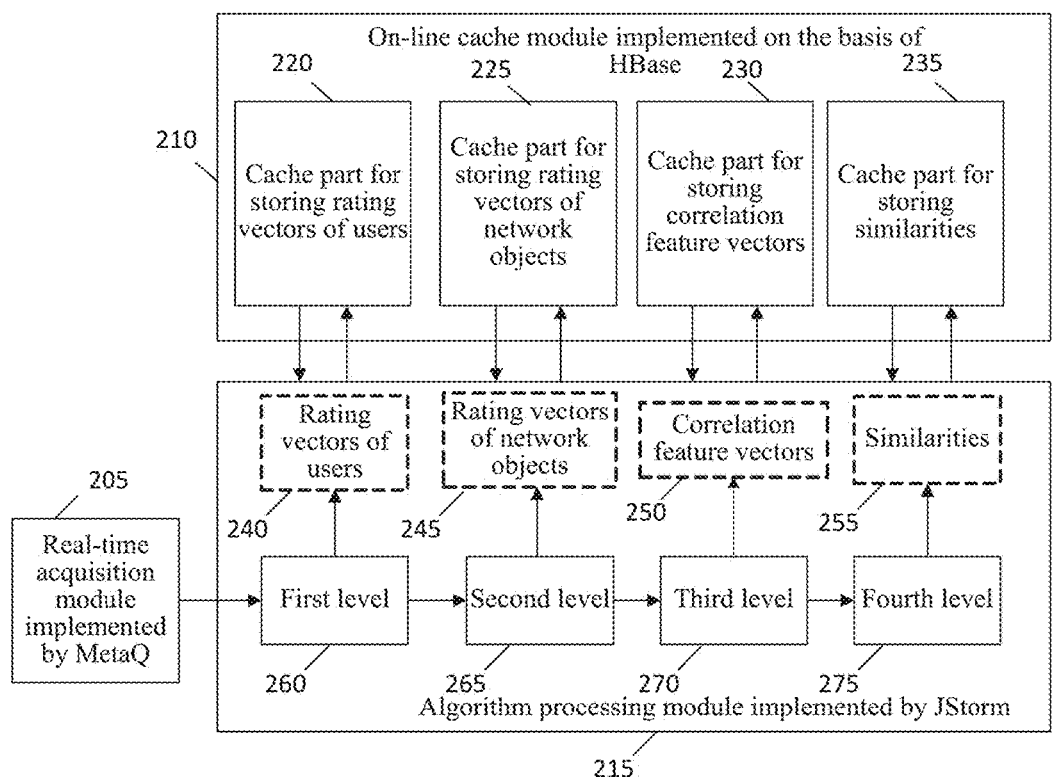
FIG. 2 is a schematic diagram of a system architecture of a recommendation method provided by one embodiment of the present disclosure.

FIG. 2 is an embodiment of a schematic diagram of a system architecture of a recommendation method provided by an embodiment of the present disclosure. As shown in FIG. 2, the system architecture includes, in one embodiment: a real-time acquisition module or logic 205 implemented by, e.g., MetaQ, an on-line cache module or logic 210 implemented on the basis of, e.g., HBase and an algorithm processing module or logic 215 implemented by, e.g., JStorm.

HBase is a high-performance, scalable distributed storage system based on NoSQL and columns, and is a distributed real-time on-line storage framework. HBase carries out storage in the form of data tables, an HBase table is an HTable, each HTable contains a plurality of rows, and each row contains a Row key and one or more Columns storing corresponding values. Each HBase column exists in a Column Family, and is identified by a Column Qualifier, each Column Family consists of a series of columns and corresponding values, and a TimeStamp stores the writing time of each record. The form of the HBase table is shown in Table 1 below:

TABLE 1

| Row key | Column qualifier | TimeStamp | value |
|---------|------------------|-----------|-------|
| 234251  | 43203245         | 132435326 | 1.0   |
| 2342513 | 12452342         | 110032426 | 3.0   |
| 435250  | 4478824          | 129934626 | 4.0   |
| 5260    | 59931161         | 130936677 | 2.0   |
| ...     | ...              | ...       | ...   |

Considering that the column type data storage structure of HBase is suitable for reading, writing and on-line storage of mass real-time sparse data, the embodiment is preferably based on, but not limited to, HBase to carry out on-line caching.

In one embodiment, the HBase-based on-line cache module comprises a cache part for storing rating vectors of users 220, a cache part for storing rating vectors of network objects 225, a cache part for storing correlation feature vectors 230 and a cache part for storing similarities 235.

The real-time acquisition module can be used for, e.g., acquiring user behavior in the network system in real time and providing real-time user behavior data for JStorm Job. After JStorm Job is started normally, first-level Spouts of JStorm read the real-time user behavior data from MetaQ, rating data of users on network objects in the previous network system is updated according to the read real-time user behavior data, and rating vectors of the users are constructed. The specific principle is as follows:

In the embodiment, r is used for representing the rating data of a user on network objects, then the rating data of the user k on the first network object is represented by $r_{k1}$, then if the number of the network objects having been rated by the user k is n before the acquisition of the real-time user behavior data, then a rating vector of the user k is generated according to the rating data of the user k on the n network objects, and is represented by $U_k$, and $U_k = <r_{k1}, r_{k2}, \ldots, r_{kn}>$. The rating data is organized here from the perspective of the users.

Considering that the user behavior data acquired in real time by MetaQ may include one or more of behavior of the existing users on the existing network objects, behavior of the new users on the existing network objects, behavior of the existing users on the new network objects and behavior of the new users on the new network objects. Because the behavior of the new users on the existing network objects, the behavior of the existing users on the new network objects and the behavior of the new users on the new network objects result in, in one embodiment, generation of new rating data, these three cases are described as a first case here, and the behavior of the existing users on the existing network objects is described as a second case.

For the first case, the first-level Spouts update the rating data of the users on the network objects in the previous network system according to the read real-time user behavior data, and construct rating vectors of the users, and the specific process is as follows:

the first-level Spouts generate new rating data represented by $r'_{kl}$ according to the real-time user behavior data, and the $r'_{kl}$ represents the rating data of the user on a network object l, and is new rating data; the first-level Spouts add the new rating data $r'_{kl}$ into the rating vector of the user k in the previous network system, so that a rating vector of the user k in the current network system, which is represented by $U'_k = <r_{k1}, r_{k2}, \ldots, r'_{kl}, \ldots, r_{kn}>$, is generated.

For the second case, the first-level Spouts update the rating data of the users on the network objects in the previous network system according to the read real-time user behavior data, and construct rating vectors of the users, and the specific process is as follows:

according to the real-time user behavior data, the first-level Spouts generate a rating data increment of the user k on the network object l, which is represented by $\Delta r_{kl}$; the first-level Spouts update the rating data $r_{kl}$ of the user k on the network object l in the previous network system according to $\Delta r_{kl}$, the updated rating data is $r'_{kl} = r_{kl} + \Delta r_{kl}$, thereby a rating vector of the user k in the current network system, which is represented by $U'_k = <r_{k1}, r_{k2}, \ldots, r'_{kl}, \ldots, r_{kn}>$, is generated.

According to the above-mentioned processing principle, the first-level Spouts 260 will gradually obtain a rating vector of each user 240 in the network system, and can store the rating vectors into the precreated cache part for storing rating vectors of users, such as the HTables. The form of an HTable is shown in Table 2:

TABLE 2

| cf:r | Row key | Type | value |
|---|---|---|---|
| u | user_id | long | //id of network object:rating data:user behavior occurrence time . . . Item_id:rating: time; . . . |
| f | r | byte | |

In Table 2, Row Key is identifiers (user_id) of users, and value is information, such as rating data of the users on network objects 245, identifiers (item_id) of the network objects and times of user behavior of the users on the network objects. In order to ensure efficient reading and writing of rating vectors of the users, all the columns are stored in a Column Family.

The first-level Spouts construct key-value pairs with identifiers of users as keys and rating data of the users on network objects as main values, the key-value pairs here are referred to as first key-value pairs in order to facilitate differentiation; taking rating data of the user k on the new network object l as an example, the generated key-value pair is $(u_k, i_l, r'_{kl}, t_{kl})$, wherein $t_{kl}$ represents the time of a user behavior of the user k on the network object l, this is adopted as data structures of arrays (tuple) which will be distributed in parallel to second-level Bolts by the first-level Spouts of JStorm, and the processes of distribution to the second-level Bolts by the first-level Spouts are grouped according to the identifier of the user, that is, the data structures corresponding to the identifier of the same user are sent together.

The second-level Bolts 265 of JStorm parse out key-value pairs $(u_k, i_l, r'_{kl}, t_{kl})$ with the identifier of the user k as a key from the tuple data structures distributed by the first-level Spouts, reverse the key-value pairs, and construct second key-value pairs $(i_l, u_k, r'_{lk}, t_{lk})$ with the identifier of the network object l as a key, $r'_{kl} = r'_{lk}$, and $t_{kl} = t_{lk}$. Then, the second-level Bolts 265 correlate the second key-value pairs with the identifier of the same network object as a key, so that a rating vector of the network object is generated, and taking the network object l as an example, the rating vector of the network object is $I'_l = <r'_{l1}, r_{l2}, \ldots, r'_{lk}, \ldots, r_{lm}>$.

According to the above-mentioned processing principle, the second-level Bolts 265 will gradually obtain a rating vector of each network object 245 in the network system, and can store the rating vectors into the precreated cache part for storing rating vectors of network objects 225, such as the HTables. The form of an HTable is shown in Table 3:

TABLE 3

| cf:r | Row key | Type | value |
|---|---|---|---|
| u | item_id | long | //id of user:rating data:user behavior occurrence time . . . user_id:rating: time; . . . |
| f | r | byte | |

In Table 3, Row Key is identifiers (item_id) of network objects, and value is mainly information, such as identifiers of users, rating data of the users on the network objects and times of user behavior of the users on the network objects. In order to ensure efficient reading and writing of rating vectors of the network objects, all the columns are stored in a Column Family.

As the second-level Bolts 265 create rating vectors of the network objects, second key-value pairs with the identifiers of the network objects as keys will be constructed or updated out, for example, $(i_l, u_k, r'_{lk}, t_{lk})$ serves as tuple data structures which will be simultaneously distributed in parallel to third-level Bolts 270 by the second-level Bolts 265 of JStorm, and the processes of distribution are grouped according to the identifiers of the network objects.

The third-level Bolts 270 of JStorm parse out the second key-value pairs with the identifiers of the network objects as the keys from the tuple data structures distributed by the second-level Bolts, such as $(i_l, u_k, r'_{lk}, t_{lk})$ the network objects having been rated by the same user form a network object subset, the rating vectors of every two (or more) of the network objects in the network object subsets are correlated, and according to the correlations between the network objects in each network object subset, the rating vectors of the network objects not correlated in the network object subsets among the network objects are correlated, so that a correlation feature vector between every two (or more) of the network objects is generated. In the process of correlating the rating vectors of every two (or more) of the network objects in the network object subsets, with changed rating data (such as newly added or updated rating data) as a reference, other network objects corresponding to the rating data which have been rated by users having rated the network objects are obtained, and correlation feature vectors between the obtained network objects and the network objects corresponding to the rating data are calculated. If a network object p and the network object l have been rated by the same user and the rating data of the network object l are new, then the rating vector of the network object p and the rating vector of the network object l are correlated to obtain a correlation feature vector, which is represented by $<I_p, I'_l> = < \ldots, (i_p, i_l, u_k, r'_{lk}, t_{lk}), \ldots >$, $p=1, \ldots, n$, n represents the sum of network objects which have been rated by the same user like the network object l, wherein the rating vector of the network object p is represented by $I_p = <r_{p1}, r_{p2}, \ldots, r_{pm}>$, and m represents the sum of users having rated the network object p.

According to the above-mentioned processing principle, the third-level Bolts 270 can gradually obtain a correlation feature vector between any two (or more) network objects in the network system, and can store the correlation feature vectors 250 into the precreated cache part for storing correlation feature vectors 230, such as the HTables. The form of an HTable is shown in Table 4:

TABLE 4

| cf:r | Row key | Type | value |
|---|---|---|---|
| u | item_idp-item_idl | long | //identifiers of users having rated two correlated network objects:rating data:user behavior occurrence time user_id:rating: time; |
| f | r | byte | |

In Table 4, Row key is a combination of identifiers of two correlated network objects (item_idp-item_idl), and value is information, such as identifiers of users having rated the two (or more) network objects, rating data of the users on the two (or more) network objects and times of user behavior of the users on the two (or more) network objects. In order to ensure efficient reading and writing of rating vectors of the network objects, the columns are stored in a Column Family.

As the third-level Bolts 270 create correlation feature vectors between network objects, correlation feature vectors between the network objects, such as <$I_p$, $I'_l$>=<..., ($i_p$, $i_l$, $u_k$, $r'_{lk}$, $t_{lk}$), ...>, will be constructed to serve as tuple data structures which can be simultaneously distributed in parallel to fourth-level Bolts 275 by the third-level Bolts 270 of JStorm, and the processes of distribution are grouped according to identifiers of two correlated network objects.

The fourth-level Bolt 275 of JStorm parses out the correlation feature vector <$I_p$, $I'_l$>=<..., ($i_p$, $i_l$, $u_k$, $r'_{lk}$, $t_{lk}$), ...> with the combination of the identifiers of the two (or more) correlated network objects as a key from the tuple data structure distributed by the third-level Bolt, and according to the correlation feature vector, similarity between the two (or more) correlated network objects of each group is calculated concurrently. In one embodiment, under the condition that the rating data of at least one of the two (or more) correlated network objects is changed, the similarity between the two (or more) is calculated, and if the rating data of both network objects is not changed, then the previous similarity can be directly adopted as current similarity. If the network object p and the network object l are correlated and the rating data of the network object l is new, then similarity between the network object p and the network object l is calculated.

For example, the Jarcard similarity coefficient can be adopted to calculate the similarity between the network object p and the network object l. First, an intersection and a union between the rating vector of the network object p and the rating vector of the network object l are calculated. The intersection is represented by: Inter($I_p$,$I'_l$)= $\Sigma_{u\in U}(r_{up} \cap r'_{ul})$; the union is represented by: Union ($I_p$,$I'_l$)=$\Sigma_{u\in U}(r_{up} \cup r'_{ul})$, U represents a user set having rated the two (or more) network objects, and u represents users in the user set. Then, according to the intersection and the union, Jarcard similarity is obtained, and is represented by:

$$sim(I_p, I'_l) = \frac{Inter(I_p, I'_l)}{Union(I_p, I'_l)}$$

For another example, cosine similarity can also be adopted to calculate the similarity between the network object p and the network object l as follows:

$$sim(I_p, I'_l) = \frac{\sum_{u\in U}(min(r_{up}, r'_{ul}) + \Delta min(r_{up}, r'_{ul}))}{\sqrt{\sum_{u\in U} itemcount(i_p) + \Delta r_{up}} \cdot \sqrt{itemcount(i'_l) + \Delta r'_{ul}}}$$

According to the above-mentioned processing principle, the fourth-level Bolts can gradually obtain similarity between any two (or more) network objects in the network system, and can store the similarities into the precreated cache part for storing similarities between network objects, such as the HTables. The form of an HTable is shown in Table 5:

TABLE 5

| cf:r | Row key | Type | value |
|---|---|---|---|
| u | item_idp-item_idl | long | //similarity value |
| f | r | byte | |

When network objects need to be recommended to users, the fourth-level Bolts 275 can carry out recommendation according to the similarity between two (or more) network objects.

Specifically, as known from, e.g., the Ebbinghaus forgetting curve law of the human being, user behavior data is effective only within a certain period of time of collaboration. Moreover, under the conditions of different application scenarios, the periods of time are different, and usually, under the case of E-commerce shopping, the period of time can be generally set as, e.g., several days or a week in order to cover main behavior demands of users. In this period of time, a user usually operates hundreds of network objects, but only k(top-k) most similar network objects among the network objects are network objects which need be considered to be recommended.

Thus, a similarity condition which the network objects need to meet can be set as a first condition. When recommendation is carried out for users requiring one or more network objects according to the similarities between the network objects, the network objects with similarities to the network objects currently operated by the users requiring one or more network objects that meet the first condition are obtained as candidate objects from the network objects in the current network system according to the similarities between the network objects, and network objects are recommended to the users requiring one or more network objects from the candidate objects. For example, the candidate objects can be sequenced, and one or more of the highest ranked network objects are recommended to the users.

For example, the first condition can be a minimum value of the similarities between the first top-k network objects in the latest period of time, which is represented by y, and then, for n network objects, a given threshold δ needs to ensure that the following equality holds, that is, it needs to be ensured that the probability that the similarity between a network object m and a network object n is less than y is δ:

$$p(sim(i_m, i_n) <= y) = \delta$$

Namely, for the similarities between the different network objects, the network objects which are not among the top-k most similar network objects can be filtered out by the given probability threshold in order to ensure that network objects are recommended from the top-k most similar network objects, thereby the accuracy and effectiveness of a recommendation result are ensured.

In addition, considering that the similarities between the network objects are symmetric, two similar network objects can be mutually and bidirectionally filtered by the equality.

If δ is small enough, then the equality can be transformed as: $sim(i_m, i_n) > y$, meaning that the similarity between the network object m and the network object n should be greater than y.

The given threshold δ can be simulated by common probability distribution, such as Poisson distribution and Gaussian distribution, and can also serve as a real-time message stream filtering mechanism on the basis of the Hoeffding boundary by referring to the real-time stream data mining field. For example, $sim(i_m, i_n)$ is represented by x, x is a random variable ranging from 0 to R (in the embodiment, R=1), x has w observed values which are independent from one another, $\bar{X}$ is a mean value of the observed values, and with the probability from 1 to δ, the Hoeffding boundary ensures that a true observed value of the random variable is $\bar{X}+\varepsilon$ at most, thus ensuring that the following probability equality holds:

$$p(x <= y) = \delta$$

$$\text{wherein } \varepsilon = \sqrt{\frac{R^2 \ln(1/\delta)}{2w}}.$$

Similarly, a similarity condition which the users need to meet can be set as a second condition. When recommendation is carried out for the users requiring one or more network objects according to the similarities between the users, the users with similarities to the users requiring one or more network objects that meet the second condition can be obtained as candidate users from the users in the current network system according to the similarities between the users, and network objects are recommended to the users requiring one or more network objects from the network objects having been rated by the candidate users.

Similarly, in one embodiment, a similarity condition which the users and the network objects need to meet can be set as a third condition. When recommendation is carried out for the users requiring one or more network objects according to the similarities between the users and the network objects, the network objects with similarities to the users requiring one or more network objects that meet the third condition can be obtained as candidate objects from the network objects in the current network system according to the similarities between the users and the network objects, and network objects are recommended to the users requiring one or more network objects from the candidate objects. For example, the candidate objects can be sequenced, and one or more of the highest ranked network objects are recommended to the users.

Further, considering that time goes by, the quantity of data, such as rating vectors of users 240, rating vectors of network objects 245, correlation feature vectors 250, similarities 255 and recommendation results, which need to be stored will likely be large. In order to save memory spaces and facilitate memory management while recommendation demands are met, the embodiment adopts a sliding window mechanism to manage data which need to be stored in the process of recommendation. In order to be adapted to the sliding window mechanism, the production of each behavior data of a user is regarded as a session, one session corresponds to one sliding window, and produced data are stored in a cache space corresponding to a sliding window. The magnitude of a sliding window threshold needs to be optimized according to multiple factors, such as numbers of all users and network objects within the number of optimal periods of time or sessions, data calculation time of an algorithm model and space complexity. In specific engineering implementation, a following backoff coverage design can be adopted to implement the sliding window mechanisms:

If the maximum number $w_{max}$ of sessions which can be stored in each record in real time is a maximum value $w_{max}$ of every real-time access, a threshold of backtracking backoff is $w_{min}$, the number of sessions eliminated by backtracking is $w_{max}-w_{min}$ in total, and the elimination criteria can be a time decay-related function, a behavior sequence model or the like, and is determined according to recommendation effects of specific application scenarios. The adoption of the mechanism not only can ensure the dynamic growth of data is within a controllable range, but can also ensure the accuracy of stream recommendation.

To sum up, because the present disclosure combines real-time user behavior data with off-line data, by utilizing the real-time user behavior data to supplement the off-line data, the accuracy of recommendation can be increased, the effect of recommendation can be improved, thereby the requirement of application scenarios requiring real-time collaboration and fast response can be met.

In order to describe each foregoing method embodiment, the method embodiments are expressed as a combination of a series of actions, but those skilled in the art should know that the present application is not limited by the sequence of the described actions because certain steps can adopt other sequences or can be carried out at the same time according to the present disclosure. Secondly, those skilled in the art should also know that the embodiments described in the description belong to preferred embodiments, and the related actions and modules are not necessary for the present disclosure.

In the embodiments, the description of each embodiment has its own focus, and parts in a certain embodiment, not described in detail, can refer to the related descriptions of the other embodiments.

For the purposes of this disclosure a module, as described above and below, is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Figure 3:
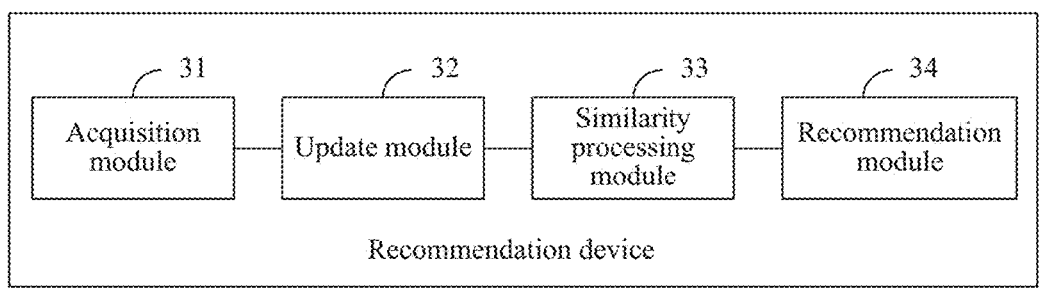
FIG. 3 is a structure diagram of a recommendation device provided by one embodiment of the present disclosure.

FIG. 3 is a structure diagram of a recommendation device provided by another embodiment of the present application. As shown in FIG. 3, the recommendation device comprises an acquisition module 31, an update module 32, a similarity processing module 33 and a recommendation module 34.

The acquisition module 31 is configured to acquire user behavior in a network system in real time to obtain real-time user behavior data. The update module 32 is configured to update rating data of users on network objects in the previous network systems according to the real-time user behavior data obtained by the acquisition module 31 to obtain rating data of the users on the network objects in the current network system.

The similarity processing module 33 is configured to obtain similarities between the users, between the network objects and/or between the users and the network objects according to the rating data of the users on the network objects in the current network system obtained by the update module 32.

The recommendation module 34 is configured to recommend network objects to users requiring one or more network objects according to the similarities between the users, between the network objects and/or between the users and the network objects obtained by the similarity processing module 33.

In one alternative embodiment, when updating rating data of users on network objects in the previous network systems according to the real-time user behavior data obtained by the acquisition module 31 to obtain rating data of the users on the network objects in the current network system, the update module 32 is specifically configured to execute at least one of the following operations:

if the real-time user behavior data includes real-time behavior data of new users on new network objects, generating rating data of the new users on the new network objects according to the real-time behavior data of the new users on the new network objects, and adding the rating data of the new users on the newly added network objects into the rating data of the users on the network objects in the previous network systems;

if the real-time user behavior data includes the real-time behavior data of the new users on existing network objects, generating rating data of the new users on the existing network objects according to the real-time behavior data of the new users on the existing network objects, and adding the rating data of the new users on the existing network objects into the rating data of the users on the network objects in the previous network systems;

if the real-time user behavior data includes real-time behavior data of existing users on the new network objects, generating rating data of the existing users on the new network objects according to the real-time behavior data of the existing users on the new network objects, and adding the rating data of the existing users on the new network objects into the rating data of the users on the network objects in the previous network systems; and if the real-time user behavior data includes real-time behavior data of the existing users on the existing network objects, generating rating data increments of the existing users on the existing network objects according to the real-time behavior data of the existing users on the existing network objects, and updating the rating data of the existing users on the existing network objects in the previous network systems according to the rating data increments.

In one embodiment, when obtaining similarities between users, between network objects and/or between the users and the network objects according to rating data of the users on the network objects in the current network system, the similarity processing module 33 is configured to:

organize the rating data of the users on the network objects in the current network system from the dimensions of the users and/or the network objects to generate rating vectors of the users and/or rating vectors of the network objects; and calculate similarities between the users, between the network objects and/or between the users and the network objects according to the rating vectors of the users and/or the rating vectors of the network objects.

Further, when organizing the rating data of the users on the network objects in the current network system from the dimensions of the users and/or the network objects to generate the rating vectors of the users and the rating vectors of the network objects, the similarity processing module 33 is specifically configured to:

carry out data structure reorganization on the rating data of the users on the network objects in the current network system to generate a plurality of first key-value pairs, the key in each first key-value pair being an identifier of a user, and the value being an identifier of a network object and the rating data of the user identified by the identifier of the user on the network object identified by the identifier of the network object;

correlate the first key-value pairs with the same key to generate rating vectors of the users identified by the key;

reverse the first key-value pairs to generate a plurality of second key-value pairs, the key of each second key-value pair being an identifier of a network object, and the value being an identifier of a user and the rating data of the user identified by the identifier of the user on the network object identified by the identifier of the network object; and correlate the second key-value pairs with the same key to generate rating vectors of the network objects identified by the key.

Further, when obtaining similarities between the users, between the network objects and/or between the users and the network objects according to the rating vectors of the users and/or the rating vectors of the network objects, the similarity processing module 33 is specifically configured to execute at least one of the following operations:

calculating similarity between every two of the network objects according to the rating vectors of the network objects; calculating similarity between every two of the users according to the rating vectors of the users; and calculating similarity between any one of the users and any one of the network objects according to the rating vectors of the users and the rating vectors of the network objects.

Further, in one embodiment, when calculating similarity between every two of the network objects according to the rating vectors of the network objects, the similarity processing module 33 is configured to: obtain network objects having been rated by the same user to generate a network object subset; correlate the rating vectors of every two of the network objects in the network object subset, correlate the rating vectors of every two of the uncorrelated network objects among the network objects according to the correlation between every two of the network objects in the network object subset to generate a correlation feature vector between every two of the network objects, and calculate similarity between every two of the network objects according to the correlation feature vector between every two of the network objects.

For example, if a first user has rated a network object A, a network object B and a network object C and a second user has rated the network object B, the network object C and a network object D, then the network object A, the network object B and the network object C form a network object subset. Accordingly, the network object B, the network object C and the network object D form a network object subset. For each network object subset, the rating vectors of every two (or more) of the network objects in the network object subset are correlated to generate a correlation feature vector between every two (or more) of the network objects. For example, for the network object subset containing the network object A, the network object B and the network object C, the rating vectors of the network object A and the network object B can be correlated to generate a correlation feature vector between the network object A and the network object B, the rating vectors of the network object A and the network object C can be correlated to generate a correlation feature vector between the network object A and the network object C, and the rating vectors of the network object B and the network object C can be correlated to generate a correlation feature vector between the network object B and the network object C. For example, for the network object subset containing the network object B, the network object C and the network object D, the rating vectors of the network object B and the network object C can be correlated to generate a correlation feature vector between the network object B and the network object C, the rating vectors of the network object B and the network object D can be correlated to generate a correlation feature vector between the network object B and the network object D, and the rating vectors of the network object C and the network object D can be correlated to generate a correlation feature vector between the network object C and the network object D. In addition, according to the correlation between every two (or more) of the network objects in the two (or more) network object subsets, uncorrelated network objects among the network objects, such as the network object A and the network object D, are determined, and then the rating vectors of the uncorrelated network objects among the network objects are correlated according to the correlation between every two (or more) of the network objects in the two (or more) network object subsets, that is, the rating vectors of the network object A and the network object D are correlated to generate a correlation feature vector between the network object A and the network object D. Thus, after the correlation feature vector between every two (or more) of the network objects is obtained, similarity between every two (or more) of the network objects is obtained according to the correlation feature vector between every two (or more) of the network objects.

Further, in one embodiment, when calculating similarity between every two (or more) of the users according to the rating vectors of the users, the similarity processing module 33 is configured to: obtain users having rated the same network object to generate a user subset; correlate the rating vectors of every two (or more) of the users in the user subset, correlating the rating vectors of every two (or more) of the uncorrelated users among the users according to the correlation between every two (or more) of the users in the user subset to generate a correlation feature vector between every two (or more) of the users, and calculate similarity between every two (or more) of the users according to the correlation feature vector between every two (or more) of the users.

For example, if a first user, a second user and a third user have respectively rated a network object A and the first user, the third user and a fourth user have respectively rated a network object B, then the first user, the second user and the third user can form a user subset, and the first user, the third user and the fourth user can form a user subset. For each user subset, the rating vectors of every two (or more) of the users in the user subset are correlated to generate a correlation feature vector between every two (or more) of the users in the user subset. Specifically, for the user subset containing the first user, the second user and the third user, the rating vectors of the first user and the second user are correlated to generate a correlation feature vector between the first user and the second user, the rating vectors of the first user and the third user are correlated to generate a correlation feature vector between the first user and the third user, and the rating vectors of the second user and the third user are correlated to generate a correlation feature vector between the second user and the third user. For the user subset containing the first user, the third user and the fourth user, the rating vectors of the first user and the third user are correlated to generate a correlation feature vector between the first user and the third user, the rating vectors of the first user and the fourth user are correlated to generate a correlation feature vector between the first user and the fourth user, and the rating vectors of the third user and the fourth user are correlated to generate a correlation feature vector between the third user and the fourth user. In addition, according to the correlation between every two (or more) of the users in the two (or more) user subsets, uncorrelated users among the users, such as the second user and the fourth user, are determined, and then the rating vectors of the uncorrelated users among the users are correlated according to the correlation between every two (or more) of the users in the two user subsets, that is, the rating vectors of the second user and the fourth user are correlated to generate a correlation feature vector between the second user and the fourth user. Thus, after the correlation feature vector between every two (or more) of the users is obtained, similarity between every two (or more) of the users is obtained according to the correlation feature vector between every two (or more) of the users.

Further, in one embodiment, when calculating similarity between any one of the users and any one of the network objects according to the rating vectors of the users and the rating vectors of the network objects, the similarity processing module 33 is configured to: for any one of the users, correlate the rating vector of the user and the rating vector of any one of the network objects to generate a correlation feature vector between the user and any one of the network objects, and obtain similarity between the user and any one of the network objects according to the correlation feature vector between the user and any one of the network objects. For example, if the network system comprises a network object A, a network object B and a network object C altogether, then the rating vector of a first user can be respectively correlated with the rating vectors of the network object A, the network object B and the network object C to generate correlation feature vectors between the first user and the network object A, the network object B and the network object C. Specifically, the rating vector of the first user and the rating vector of the network object A are correlated to generate a correlation feature vector between the first user and the network object A, the rating vector of the first user and the rating vector of the network object B are correlated to generate a correlation feature vector between the first user and the network object B, and the rating vector of the first user and the rating vector of the network object C are correlated to generate a correlation feature vector between the first user and the network object C.

In one embodiment, the recommendation module 34 is configured to execute at least one of the following operations:

obtaining the network objects with the similarities to the network objects currently operated by the users requiring one or more network objects that meet a first preset condition as candidate objects from the network objects in the current network system according to the similarities between the network objects; recommending network objects to the users requiring one or more network objects from the candidate objects;

obtaining the users with the similarities to the users requiring one or more network objects that meet a second preset condition as candidate users from the users in the current network system according to the similarities between the users; recommending network objects to the users requiring one or more network objects from the network objects having been rated by the candidate users;

obtaining the network objects with the similarities to the users requiring one or more network objects that meet a third preset condition as candidate objects from the network objects in the current network system according to the similarities between the users and the network objects; and recommending network objects to the users requiring one or more network objects from the candidate objects.

In one embodiment, the network objects can be at least one of commodity objects and service objects, but are not limited to these. The service objects can be a car washing service, maintenance service, massage service, cleaning service, door-to-door cook service, housekeeping service, tutoring service, entertainment service, dining service, travel service, hotel service, car rental service, etc. Accordingly, the user behavior include at least one of browsing, adding to favorites, adding to shopping cart, purchasing, paying and reviewing.

In the specific implementation of deployment, the deployment of the modules in the recommendation device of the embodiment can be distributed, and a deployment implementation scheme is shown in FIG. 2. MetaQ can be implemented by the acquisition module 31, and the functions of the update module 32, the similarity processing module 33 and the recommendation module 34 can be implemented by a JStorm Job topology. Because the recommendation device provided by the embodiment can combine real-time user behavior data with off-line data, by utilizing the real-time user behavior data to supplement the off-line data, the accuracy of recommendation can be increased, and the effect of recommendation can be improved, thereby the requirement of application scenarios requiring real-time collaboration and fast response can be met.

In the several embodiments provided by the present disclosure, it should be understood that the disclosed systems, device and methods can be implemented in other ways. For example, the device embodiment described above is merely schematic, for example, the division of the units is merely a logical function division, but there can be other division methods in practical implementation, for example, a plurality of units or components can be combined or can be integrated into another system, or some features can be ignored, or not executed. From another point, the displayed or discussed intercoupling or direct coupling or communication connection can depend on some interfaces, and the indirect coupling or communication connection of the device or the units can be electrical, mechanical or other forms.

The units described as separate parts may or may not be physically separate, and the parts shown as units may or may not be physical units, and not only can be located in one place, but can also be distributed onto a plurality of network units. Part or all of the units can be chosen to implement the purpose of the embodiment schemes according to actual requirements.

In addition, respective function units in respective embodiments of the present application can be integrated into one processing unit, or respective units can physically exist alone, or two or more units can be integrated into one unit. The integrated unit can be put into practice in the form of hardware or in the form of hardware coupled with a software function unit.

The integrated unit which is put into practice in the form of the software function unit can be stored in an accessible storage medium for computers. The software function unit stored in the storage medium includes a number of instructions to make a computer device (such as a personal computer, a server or a network device) or a processor to execute part of the steps of the method described by each embodiment of the present application. The foregoing storage medium can be various media capable of storing program codes, such as a USB flash disk, a mobile hard disk, a read-only memory (ROM), a random access memory (RAM), a disk or a compact disk.

It should be noted that the embodiments are only used to describe the technical schemes of the present application, rather than limit the technical schemes of the present application; although the present application is described in detail with reference to the forgoing embodiments, those skilled in the art should understand that they can still modify the technical scheme recorded in each forgoing embodiment or equivalently replace part of the technical features; however, these modifications or replacements should not make the essences of corresponding technical schemes depart from the spirit and scope of the technical scheme of each embodiment of the present application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A recommendation method, comprising:

acquiring, by a processor, current user behavior data in a currently operating network system in real time, to obtain real-time user behavior data of users on the network, the current user behavior data representing currently occurring user rating activities of the users on the network;

updating, by the processor, existing rating data of the users, the existing rating data representing user ratings of network objects made by the users during prior interactions with the network system or other network systems, the updating comprising modifying the user ratings in accordance with the real-time acquired user behavior data, to obtain current user rating data of the users currently interacting with the network system;

organizing, by the processor, the current user rating data on network objects based on one or more of dimensions of the users or one or more dimensions of the network objects, to generate one or more of rating vectors of the users or one or more rating vectors of the network objects;

calculating, by the processor, based upon the current user rating data, one or more similarities chosen from a group of similarities consisting of similarities between the users on the network, similarities between the network objects rated by the users, and similarities between the users and the network objects, wherein calculating similarities between the users on the network comprises calculating similarity between every two of the users according to the rating vectors of the users, wherein calculating similarities between the network objects rated by the users comprises calculating similarities between every two of the network objects according to the rating vectors of the network objects, and wherein calculating similarities between the users and the network objects comprises calculating similarity between any one of the users and any one of the network objects according to the rating vectors of the users and the rating vectors of the network objects; and sending to users, by the processor, recommendations for new recommended network objects to users according to one or more of the determined similarities, the recommendations being sent to users while the users are currently interacting with the network system.

2. The method according to claim 1, the updating existing rating data of the users comprising executing of one or more operations selected from a group of operations consisting of:

if the real-time user behavior data comprises real-time behavior data of new users on new network objects, generating, by the processor, rating data of the new users on the new network objects according to the real-time behavior data of the new users on the new network objects, and adding the rating data of the new users on the new network objects into the rating data of the users on the network objects in the network system or other network systems;

if the real-time user behavior data comprises the real-time behavior data of new users on existing network objects, generating, by the processor, rating data of the new users on the existing network objects according to the real-time behavior data of the new users on the existing network objects, and adding the rating data of the new users on the existing network objects into the rating data of the users on the network objects in the network system or other network systems;

if the real-time user behavior data comprises real-time behavior data of existing users on new network objects, generating, by the processor, rating data of the existing users on the new network objects according to the real-time behavior data of the existing users on the new network objects, and adding the rating data of the existing users on the new network objects into the rating data of the users on the network objects in the network system or other network systems; and if the real-time user behavior data comprises real-time behavior data of the existing users on existing network objects, generating, by the processor, rating data increments of the existing users on the existing network objects according to the real-time behavior data of the existing users on the existing network objects, and updating the rating data of the existing users on the existing network objects in the network system or other network systems based on the rating data increments.

3. The method according to claim 1, the organizing the current user rating data of the users on the network objects comprising:

executing, by the processor, data structure reorganization on the current user rating data to generate a plurality of first key-value pairs, a key in each first key-value pair being an identifier of a user, and a value being an identifier of a network object and the rating data of the user identified by the identifier of the user on the network object identified by the identifier of the network object;

correlating, by the processor, the first key-value pairs with a first key to generate rating vectors of users identified by the first key;

reversing, by the processor, the first key-value pairs to generate a plurality of second key-value pairs, a second key-value pair key of each second key-value pair being an identifier of a network object, and a second-key-value pair value being an identifier of a user and the rating data of the user identified by the identifier of the user on the network object identified by the identifier of the network object; and correlating, by the processor, the second key-value pairs with a second key to generate rating vectors of the network objects identified by the second key.

4. The method according to claim 1, the calculating similarity between every two of the network objects according to the rating vectors of the network objects comprising:

obtaining, by the processor, network objects having been rated by a same user to generate a network object subset;

correlating, by the processor, rating vectors of every two of the network objects in the network object subset, and correlating, by the processor, rating vectors of every two of uncorrelated network objects among the network objects according to the correlation between every two of the network objects in the network object subset to generate a correlation feature vector between every two of the network objects; and calculating, by the processor, similarity between every two of the network objects according to the correlation feature vector between every two of the network objects; and the calculating a similarity between every two of the users according to the rating vectors of the users comprising:
obtaining, by the processor, users having rated a same network object to generate a user subset;
correlating the rating vectors of every two of the users in the user subset, and correlating the rating vectors of every two of uncorrelated users among the users according to the correlation between every two of the users in the user subset to generate a correlation feature vector between every two of the users; and
calculating, by the processor, similarity between every two of the users according to the correlation feature vector between every two of the users; and
the calculating a similarity between any one of the users and any one of the network objects according to the rating vectors of the users and the rating vectors of the network objects comprising:
for any one of the users, correlating the rating vector of the user and the rating vector of any one of the network objects to generate a correlation feature vector between the user and any one of the network objects, and calculating a similarity between the user and any one of the network objects according to the correlation feature vector between the user and any one of the network objects.

5. The method according to claim 1, the sending recommendations to users for new recommended network objects according to one or more of the determined similarities comprising at least one of the following operations:
obtaining, by the processor, network objects with similarities to the network objects currently operated by the users requiring one or more network objects that meet a first preset condition as candidate objects from the network objects according to the similarities between the network objects and recommending network objects to the users requiring one or more network objects from the candidate objects;
obtaining, by the processor, users with similarities to the users requiring one or more network objects that meet a second preset condition as candidate users from the users according to the similarities between the users and recommending network objects to the users requiring one or more network objects from the network objects having been rated by the candidate users; and
obtaining, by the processor, network objects with similarities to the users requiring one or more network objects that meet a third preset condition as candidate objects from the network objects according to the similarities between the users and the network objects and recommending network objects to the users requiring one or more network objects from the candidate objects.

6. The method according to claim 1, the network objects comprising one of commodity objects and service objects; and the user behavior data comprising data about user behaviors selected from a group of behaviors consisting of: browsing, adding to favorites, adding to shopping cart, purchasing, paying, and reviewing.

7. A recommendation device, comprising:
a processor;
a storage medium for tangibly storing thereon program logic for execution by the processor, that when executed cause the processor to perform the operations of:
acquiring current user behavior in a currently operating network system in real time to obtain user behavior data of users on the network, the current user behavior data representing currently occurring user rating activities of the users on the network;
updating existing rating data of the users, the existing rating data representing user ratings of network objects made by the users during prior interactions with the network system or other network systems, the updating comprising modifying the user ratings in accordance with the real time acquired user behavior data to obtain current user rating data of the users currently interacting with the network system;
organizing, by the processor, the current user rating data on network objects based on one or more of dimensions of the users or one or more dimensions of the network objects, to generate one or more of rating vectors of the users or one or more rating vectors of the network objects;
calculating, based upon the current user rating data, one or more of similarities chosen from a group of similarities consisting of similarities between the users, between the network objects rated by the user, and between the users and the network objects,
wherein calculating similarities between the users on the network comprises calculating similarity between every two of the users according to the rating vectors of the users,
wherein calculating similarities between the network objects rated by the users comprises calculating similarities between every two of the network objects according to the rating vectors of the network objects, and
wherein calculating similarities between the users and the network objects comprises calculating similarity between any one of the users and any one of the network objects according to the rating vectors of the users and the rating vectors of the network objects; and
sending recommendations for new recommended network objects to users according to the one or more of the determined similarities, the recommendations being sent to users while the users are currently interacting with the network system.

8. The device according to claim 7, the updating existing rating data of the users comprises at least one of:
if the user behavior data comprises behavior data of new users on new network objects, generating rating data of the new users on the new network objects according to the behavior data of the new users on the new network objects, and adding the rating data of the new users on newly added network objects into the rating data of the users on the network objects in the network system or other network systems;
if the user behavior data comprises the behavior data of new users on existing network objects, generating rating data of the new users on the existing network objects according to the behavior data of the new users on the existing network objects, and adding the rating data of the new users on the existing network objects into the rating data of the users on the network objects in the network system or other network systems;
if the real-time user behavior data comprises real-time behavior data of existing users on the new network objects, generating rating data of the existing users on the new network objects according to the real-time behavior data of the existing users on the new network objects, and adding the rating data of the existing users on the new network objects into the rating data of the users on the network objects in the network system or other network systems; and if the real-time user behavior data comprises real-time behavior data of the existing users on the existing network objects, generating rating data increments of the existing users on the existing network objects according to the real-time behavior data of the existing users on the existing network objects, and updating the rating data of the existing users on the existing network objects in the network system or other network systems based on the rating data increments.

9. The device according to claim 7, the calculating one or more of similarities further comprising:

executing data structure reorganization on the current user rating data to generate a plurality of first key-value pairs, a key in each first key-value pair being an identifier of a user, and a value being an identifier of a network object and the rating data of the user identified by the identifier of the user on the network object identified by the identifier of the network object;

correlating the first key-value pairs with a first key to generate rating vectors of the users identified by the first key;

reversing the first key-value pairs to generate a plurality of second key-value pairs, a second key-value pair key of each second key-value pair being an identifier of a network object, and a second key-value pair value being an identifier of a user and the rating data of the user identified by the identifier of the user on the network object identified by the identifier of the network object; and correlating the second key-value pairs with a second key to generate rating vectors of the network objects identified by the key.

10. The device according to claim 7, the calculating similarity between every two of the network objects according to the rating vectors of the network objects comprises:

obtaining network objects having been rated by a same user to generate a network object subset;

correlating rating vectors of every two of the network objects in the network object subset, and correlate rating vectors of every two of uncorrelated network objects among the network objects according to the correlation between every two of the network objects in the network object subset to generate a correlation feature vector between every two of the network objects; and calculating a similarity between every two of the network objects according to the correlation feature vector between every two of the network objects; and the calculating similarity between every two of the users according to the rating vectors of the users further comprises:

obtaining users having rated a same network object to generate a user subset;

correlating the rating vectors of every two of the users in the user subset, and correlate the rating vectors of every two of uncorrelated users among the users according to the correlation between every two of the users in the user subset to generate a correlation feature vector between every two of the users; and calculating a similarity between every two of the users according to the correlation feature vector between every two of the users; and the calculating a similarity between any one of the users and any one of the network objects according to the rating vectors of the users and the rating vectors of the network objects comprises:

for any one of the users, correlating the rating vector of the user and the rating vector of any one of the network objects to generate a correlation feature vector between the user and any one of the network objects, and calculate a similarity between the user and any one of the network objects according to the correlation feature vector between the user and any one of the network objects.

11. The device according to claim 7, the sending recommendations for new recommended network objects to users comprising at least one of:

obtaining network objects with similarities to the network objects currently operated by the users requiring one or more network objects that meet a first preset condition as candidate objects from the network objects according to the similarities between the network objects, and recommending network objects to the users requiring one or more network objects from the candidate objects;

obtaining users with similarities to the users requiring one or more network objects that meet a second preset condition as candidate users from the users according to the similarities between the users, and recommending network objects to the users requiring one or more network objects from the network objects having been rated by the candidate users; and obtaining network objects with similarities to the users requiring one or more network objects that meet a third preset condition as candidate objects from the network objects according to the similarities between the users and the network objects, and recommending network objects to the users requiring one or more network objects from the candidate objects.

12. The device according to claim 7, the network objects comprising one of commodity objects and service objects; and the user behavior data comprising data about user behaviors selected from a group of behaviors consisting of: browsing, adding to favorites, adding to shopping cart, purchasing, paying, and reviewing.

13. A non-transitory computer readable storage medium tangibly storing computer program instructions capable of being executed by a computer processor, the computer program instructions defining the steps of:

acquiring, by a processor, current user behavior data in a currently operating network system in real time to obtain real-time user behavior data of users on the network, the current user behavior data representing currently occurring user rating activities of the users on the network;

updating, by the processor, existing rating data of the users, the existing rating data representing user ratings of network objects made by the users during prior interactions with the network system or other network systems, the updating comprising modifying the user ratings in accordance with the real-time acquired user behavior data to obtain current user rating data of the users currently interacting with the network system;

organizing, by the processor, the current user rating data on network objects based on one or more of dimensions of the users or one or more dimensions of the network objects, to generate one or more of rating vectors of the users or one or more rating vectors of the network objects;

calculating, by the processor, based upon the current user rating data, one or more similarities chosen from a group of similarities consisting of similarities between the users on the network, similarities between the network objects rated by the users, and between similarities between the users and the network objects, wherein calculating similarities between the users on the network comprises calculating similarity between every two of the users according to the rating vectors of the users, wherein calculating similarities between the network objects rated by the users comprises calculating similarities between every two of the network objects according to the rating vectors of the network objects, and wherein calculating similarities between the users and the network objects comprises calculating similarity between any one of the users and any one of the network objects according to the rating vectors of the users and the rating vectors of the network objects; and sending to users, by the processor, recommendations for new recommended network objects to users according to one or more of the determined similarities, the recommendations being sent to users while the users are currently interacting with the network system.

14. The medium according to claim 13, the updating existing rating data of the users comprising execution of one or more operations selected from a group of operations consisting of:

if the user behavior data comprises behavior data of new users on new network objects, generating, by the processor, rating data of the new users on the new network objects according to the behavior data of the new users on the new network objects, and adding the rating data of the new users on the new network objects into the rating data of the users on the network objects in the previous network systems;

if the user behavior data comprises the behavior data of the new users on existing network objects, generating, by the processor, rating data of the new users on the existing network objects according to the behavior data of the new users on the existing network objects, and adding the rating data of the new users on the existing network objects into the rating data of the users on the network objects in the network system or other network systems;

if the user behavior data comprises behavior data of existing users on the new network objects, generating, by the processor, rating data of the existing users on the new network objects according to the behavior data of the existing users on the new network objects, and adding the rating data of the existing users on the new network objects into the rating data of the users on the network objects in the network system or other network systems; and if the user behavior data comprises behavior data of the existing users on the existing network objects, generating, by the processor, rating data increments of the existing users on the existing network objects according to the behavior data of the existing users on the existing network objects, and updating the rating data of the existing users on the existing network objects in the network system or other network systems according to the rating data increments.

15. The medium according to claim 13, the organizing the current user rating data of the users on the network objects comprising:

executing a data structure reorganization on the current user rating data to generate a plurality of first key-value pairs, a key in each first key-value pair being an identifier of a user, and a value being an identifier of a network object and the rating data of the user identified by the identifier of the user on the network object identified by the identifier of the network object;

correlating, by the processor, the first key-value pairs with a first key to generate rating vectors of users identified by the first key;

reversing, by the processor, the first key-value pairs to generate a plurality of second key-value pairs, a second key-value pair key of each second key-value pair being an identifier of a network object, and a second-key-value pair value being an identifier of a user and the rating data of the user identified by the identifier of the user on the network object identified by the identifier of the network object; and correlating, by the processor, the second key-value pairs with a second key to generate rating vectors of the network objects identified by the second key.

* * * * *